United States Patent [19]
Gäng et al.

[11] Patent Number: 5,721,410
[45] Date of Patent: Feb. 24, 1998

[54] SAFETY DEVICE ON A PRINTING PRESS

[75] Inventors: Manfred Gäng, Oberhausen/Rheinhausen; Reiner Pfister, Leimen; Bernd Ruf, Weiterstadt, all of Germany

[73] Assignee: Heidelberger Druckmaschinen AG, Heidelberg, Germany

[21] Appl. No.: 798,510

[22] Filed: Feb. 10, 1997

[30] Foreign Application Priority Data

Feb. 10, 1996 [DE] Germany ............... 196 04 923.7

[51] Int. Cl.$^6$ ........................................ B41F 1/60
[52] U.S. Cl. ..................... 200/294; 200/295; 101/216
[58] Field of Search ........................ 101/216, 479, 101/480, 484; 200/293, 294, 295, 301

[56] References Cited

U.S. PATENT DOCUMENTS

| | | | |
|---|---|---|---|
| 4,669,380 | 6/1987 | Seib et al. | 101/216 |
| 5,178,069 | 1/1993 | Rodi | 101/216 |
| 5,487,336 | 1/1996 | Simeth | 101/216 |

*Primary Examiner*—Edgar S. Burr
*Assistant Examiner*—Steven S. Kelley
*Attorney, Agent, or Firm*—Herbert L. Lerner; Laurence A. Greenberg

[57] ABSTRACT

A safety device on a printing press, including at least one switch, a mechanical protective device changeable in position for operating the switch, the switch being fastened to a frame of the printing press so as to be adjustable in position and releasable from the frame, and connecting elements by the aid of which the switch is firmly seated on a base plate and held immovably on the frame, includes an intermediate plate formed of a relatively soft material disposed between respective fastening surfaces of the base plate and the frame, the intermediate plate being secured in position against movement in a direction parallel to the fastening surfaces, the fastening surface of the base plate having at least one projection formed of a material relatively harder than the relatively soft material of the intermediate plate, the projection being pressable into the relatively soft material of the intermediate plate by holding forces exerted by the connecting elements perpendicularly to the respective fastening surfaces of the base plate and the frame.

5 Claims, 3 Drawing Sheets

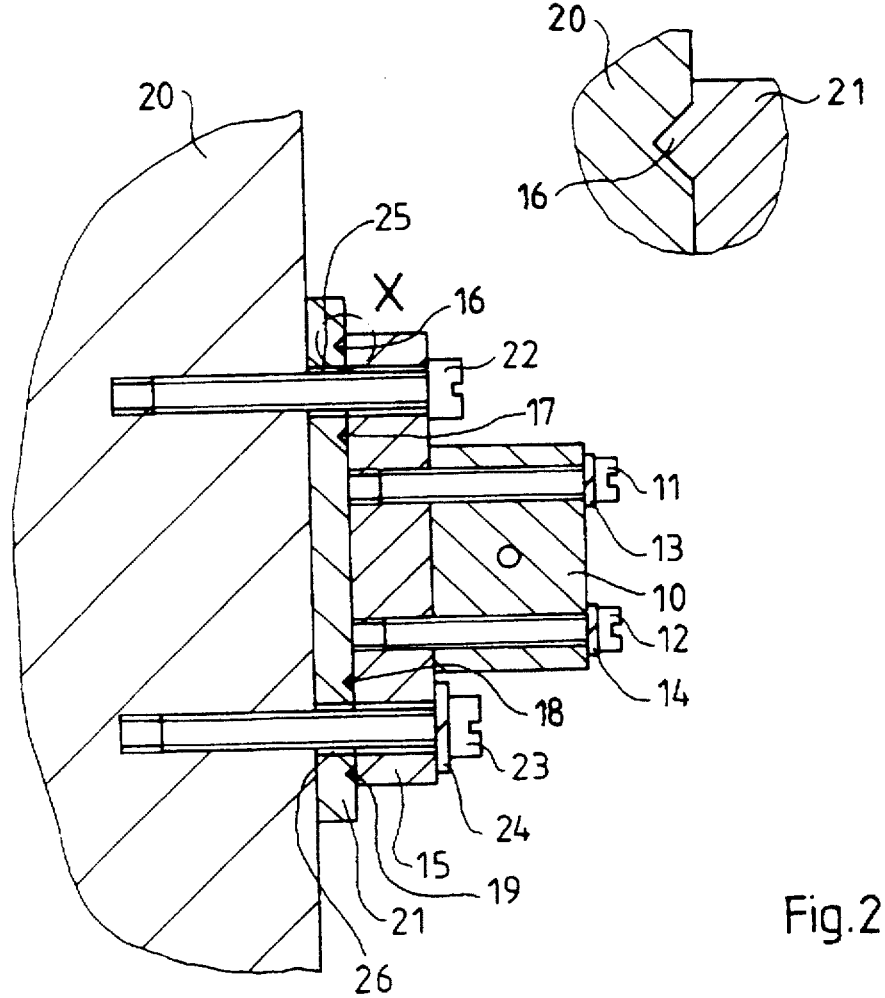

SAFETY DEVICE ON A PRINTING PRESS

BACKGROUND OF THE INVENTION

Field of the Invention

The invention relates to a safety device on a printing press and, more particularly, wherein parts of the press which are in motion are protected by mechanical protective devices from being touched.

With respect to printing presses, it has become known heretofore to provide protective grids, protective bars or similar mechanical protective devices for preventing people or objects from coming into contact with moving machine printing-press parts during the operation of a printing press. The mechanical protection devices are disposed so that they are removable or are movable away from the protective location thereof, in order to ensure access to given press parts for the purpose of performing cleaning and servicing work while the press is not in operation or is operating at a low speed. For reasons of safety, it should not be possible to set the printing press into operation while the protective device is removed. Protective devices on printing presses are therefore provided with switches which are responsive to or actuated by a change in position of the mechanical protective devices. Such switches may be conventional contact switches or switches having semiconductor components, such as optoelectronic position sensors, for example.

The switches are fixed to the frame of the printing press either directly or through the intermediary of auxiliary elements. The switches are controlled by varying the position of the mechanical protective device or by varying the position of a mechanical element coupled with the protective device. The electrical and mechanical functions are generally performed in accordance with the principle of single-error safety, even in the event of an occurrence of unforeseen operating incidents.

The mechanical or electrical switches used in safety devices are mass-produced appliances. In actual situations, respectively, the switches are provided with housings and base plates which ensure that they are immovably fastened onto the frame of the printing press. A disadvantage thereof is that the housing, the base plates and the auxiliary elements must be constructed separately if they are to be assembled on frame parts the hardness levels of which differ quite considerably.

SUMMARY OF THE INVENTION

It is accordingly an object of the invention to provide a safety device on a printing press which has a switch assemblable in keeping with the safety requirements irrespective of the hardness of the frame onto which the switch is to be fastened.

With the foregoing and other objects in view, there is provided, in accordance with the invention, a safety device on a printing press, including at least one switch, a mechanical protective device changeable in position for operating the switch, the switch being fastened to a frame of the printing press so as to be adjustable in position and releasable from the frame, and connecting elements by the aid of which the switch is firmly seated on a base plate and held immovably on the frame, comprising an intermediate plate formed of a relatively soft material disposed between respective fastening surfaces of the base plate and the frame, the intermediate plate being secured in position against movement in a direction parallel to the fastening surfaces, the fastening surface of the base plate having at least one projection formed of a material relatively harder than the relatively soft material of the intermediate plate, the projection being pressable into the relatively soft material of the intermediate plate by holding forces exerted by the connecting elements perpendicularly to the respective fastening surfaces of the base plate and the frame.

In accordance with another feature of the invention, the intermediate plate is formed of aluminum.

In accordance with a further feature of the invention, the projection is formed as a stud.

In accordance with an added feature of the invention, the projection is an integral part of the base plate.

In accordance with a concomitant feature of the invention, the base plate has a plurality of the projections extending from the fastening surface thereof.

With the aid of the invention, it is possible to mount a switch on a frame formed of material having any desired hardness. With the device of the invention, assurance of so-called single-error safety, a term which will be defined more fully hereinafter in the description of the inventive device, is provided. The connecting elements prevent the intermediate plate formed of soft material from sliding. The studs of the base plate penetrate into the material of the intermediate plate only when the exact position of the switch has been determined and the connecting elements have been tightened, so that the required amount of compression exists between the base plate, the intermediate plate and the frame.

The base plate with the stud or studs can be structurally integrated or unified with the switch, or it can be embodied as a separate auxiliary element. The frame need not necessarily be of unipartite construction. It may be formed of a plurality of individual parts, of which one thereof is constructed specifically for fastening the switch.

Other features which are considered as characteristic for the invention are set forth in the appended claims.

Although the invention is illustrated and described herein as embodied in a safety device on a printing press, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

BRIEF DESCRIPTION OF THE DRAWINGS

FIG. 2 is a cross-sectional view of FIG. 1 taken along the line II—II in the direction of the arrows, the line II—II representing a plane passing through fastening elements of a respective switch of the safety device;

FIG. 3 is an enlarged fragmentary view of FIG. 2 showing the encircled region X in grater detail.

DESCRIPTION OF THE PREFERRED EMBODIMENTS

Figure 1:
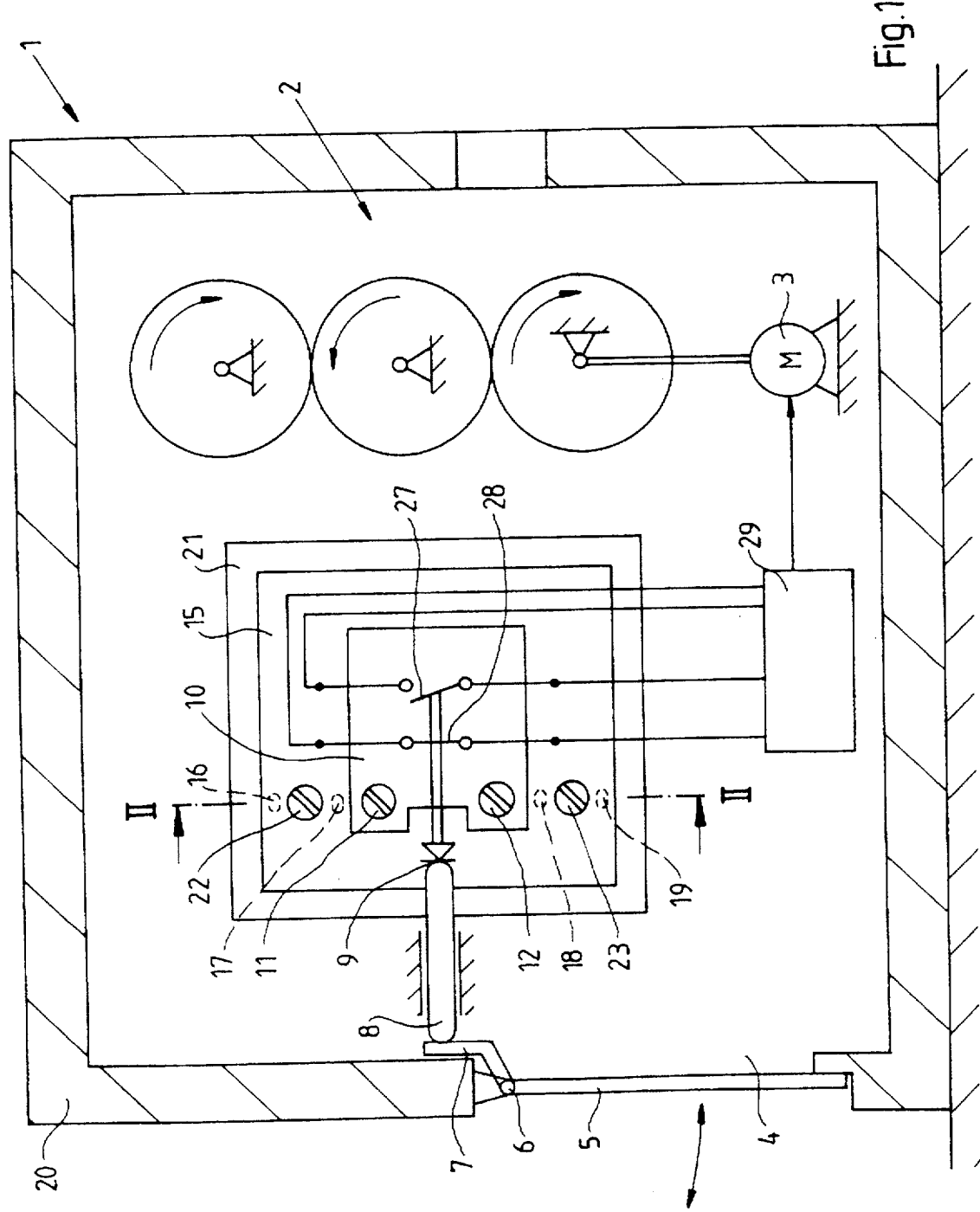
FIG. 1 is a diagrammatic and schematic view of a safety device on a printing press, in accordance with the invention.

Referring now to the drawings and, first, particularly to FIG. 1 thereof, there is shown therein diagrammatically and schematically a printing unit 1 of a printing press, wherein a cylinder 2 is drivable by a motor 3. The printing unit 1 has a frame 20 formed with an opening 4 which is closable by a protective grid 5. The protective grid 5 is disposed so as to be swivellable about an articulated joint 6. Disposed on the protective grid 5 is an actuating element 7 engageable by a plunger or rammer 8 which, when the protective grid 5 is closed, engages another actuating element 9 of a switch 10.

As shown in greater detail in FIG. 2, the switch 10 is fastened to a base plate 15 with the aid of two screws 11 and 12, and spring disks or lock washers 13 and 14. As shown in even greater detail in FIG. 3, on a side of the base plate 15 facing away from the switch 10, the base plate 15 is formed with studs or projections 16, 17, 18 and 19. Between the base plate 15, which is made of steel, and the frame 20 of the printing press is a plate 21 made of aluminum. The base plate 15 carrying the switch 10 is fastened to the frame 20 with the aid of screws 22 and 23, and a spring disk or lock washer 24, the plate 21 being formed with bore holes 25 and 26 through which the screws 22 and 23, respectively, extend. The switch 10 has a respective break contact 27 and a respective make contact 28, the terminals of which are connected to a control device 29. The motor 3 is also connected to the control device 29.

Figure 4:
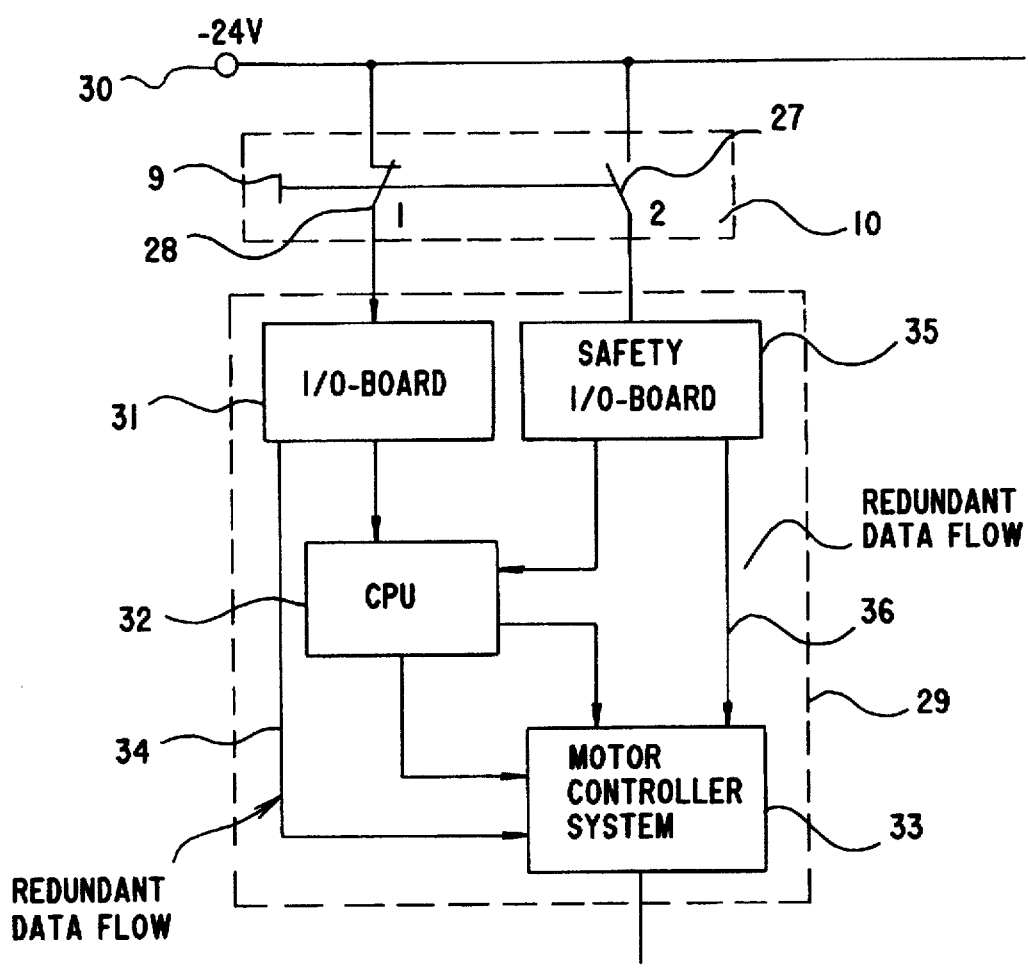
FIG. 4 is a circuit diagram of a control system for the respective switch of the safety device.

As illustrated in the circuit diagram of FIG. 4, The break and make contacts 27 and 28, respectively, are connected to a voltage supply source 30. The make contact 28 is connected to a computer processing unit (CPU) 32 via an input/output (I/O) board 31, both of which form part of the control device 29. When the switch 10 is actuated, a motor controller system 33 of the control device 29 is energized with the aid of the CPU 32 to switch off the motor 3. Furthermore, via a redundant connection 34 provided between the I/O board 31 and the motor controller system 33 the switching-off of the motor 3 is also induced. The break contact 27 is connected to a safety I/O board of the control device 29 and operates just like the make contact 28, as noted hereinabove, with the aid of the CPU 32 and another redundant connection 36 to switch off the motor 3.

By the so-called single-error safety switch-off, there is meant that even upon the failure of any one of the elements 27, 28, 31, 32, 33, 2, 4, 35 or 36, the motor 3 is able to be switched off safely and reliably.

The operation of the foregoing safety device is described hereinafter:

After a housing of the switch 10 has been fastened onto the base plate 15, the plate 21 is added, and the base plate 15 is fastened loosely with screws 22 and 23 onto the frame 20. The base plate 15 is shifted or adjusted on the frame 20, within the play permitted by the bore holes formed in the base plate 15, so that when the protective grid 5 is closed, the break contact 27 is securely closed, and the make contact 28 is securely opened. The screws 22 and 23 are firmly tightened in the desired position of the switch 10, the projections or studs 16 to 19 being pressed into the material of the plate 21. This occurs without any difficulty because the hardness of the aluminum plate 21 is considerably less than the hardness of the steel projections or studs 16 to 19. The so-called single-error safety is thereby assured for the mechanical fastening of the switch 10. Even when one of the screws 22, 23 is loosened, the base plate 15 carrying the switch 10 remains immovable because the projections or studs 16 to 19 are seated formlockingly, i.e., positively, in the softer material of the plate 21, and the position of the plate 21 is fixed by the screws 22 and 23. In this regard, it is noted that a form-locking connection is one which connects two elements together as a result of the shape of the elements themselves, as opposed to a force-locking connection, which locks the elements together by force external to the elements. When the protective grid 5 is opened, the contacts 27 and 28 assume a respective inverse setting or position. The switching states can be evaluated by the control device 29, so that the motor 3 can be switched without tension, i.e., electrically dead, when the protective grid 5 is opened.

We claim:

1. A safety device on a printing press, including at least one switch, a mechanical protective device changeable in position for operating the switch, the switch being fastened to a frame of the printing press so as to be adjustable in position and releasable from the frame, and connecting elements by the aid of which the switch is firmly seated on a base plate and held immovably on the frame, comprising an intermediate plate formed of a relatively soft material disposed between respective fastening surfaces of the base plate and the frame, said intermediate plate being secured in position against movement in a direction parallel to said fastening surfaces, said fastening surface of the base plate having at least one projection formed of a material relatively harder than the relatively soft material of said intermediate plate, said projection being pressable into the relatively soft material of the intermediate plate by holding forces exerted by the connecting elements perpendicularly to the respective fastening surfaces of the base plate and the frame.

2. The safety switch according to claim 1, wherein said intermediate plate is formed of aluminum.

3. The safety switch according to claim 1, wherein said projection is formed as a stud.

4. The safety switch according to claim 1, wherein said projection is an integral part of the base plate.

5. The safety switch according to claim 1, wherein the base plate has a plurality of the projections extending from the fastening surface thereof.

* * * * *